J. S. Getchell,
Windlass.

No. 56,034. Patented July 3, 1866.

Witnesses:
Jas. A. Service
J. M. B. Lovington

Inventor:
J. S. Getchell
by Munn & Co.
Attys

UNITED STATES PATENT OFFICE.

JOHN S. GETCHELL, OF MACHIAS, MAINE.

IMPROVED SHIP'S WINDLASS.

Specification forming part of Letters Patent No. 56,034, dated July 3, 1866.

*To all whom it may concern:*

Be it known that I, JOHN S. GETCHELL, of Machias, Washington county, State of Maine, have invented a new and useful Improvement in Ships' Windlasses; and I do hereby declare that the following is a full, clear, and exact description thereof, which will enable others skilled in the art to make and use the same, reference being had to the accompanying drawings, forming part of this specification, in which—

Figure 2:
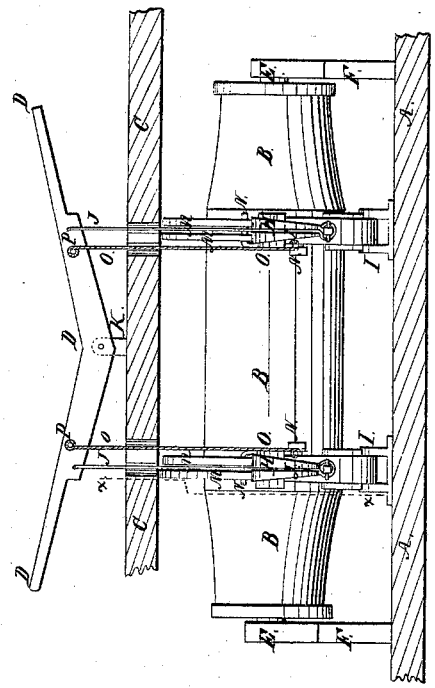
Figure 1:
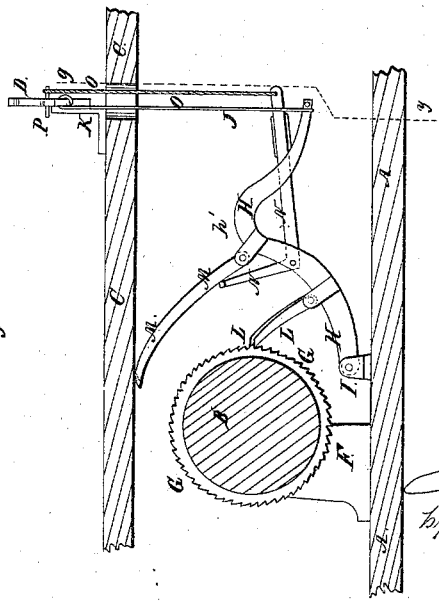

Figure 1 is a cross-section of a ship's windlass with my improvement attached, taken through the line $x\ x$, Fig. 2. Fig. 2 is a side view of the same, partly in section, through the line $y\ y$, Fig. 1.

Similar letters of reference indicate like parts.

My invention has for its object to furnish an improvement in ships' windlasses by means of which the windlass may be worked with increased power or increased speed, as may be desired; and it consists in the combination of two sets of single or double pawls and bent lever-stops with each other, with the ratchet-wheels of the windlass, and with the operating-levers.

A represents a portion of the forecastle-deck of a ship, upon which the windlass B is placed. C represents a portion of the top-gallant forecastle-deck, upon which is placed the long-armed levers D. The windlass B, about the construction of which there is nothing new, is supported by and revolves in bearings E attached to the supports F in the ordinary manner.

G are the ratchet-wheels, attached to the windlass B in the ordinary manner. The lever H, to which the pawls and stop are pivoted, is pivoted at its lower end to the supports I, which are firmly secured to the forecastle-deck. These levers H are made in the form shown in Fig. 1, and their upper ends are connected to the long-armed levers D by bars J passing up through the top-gallant forecastle-deck, as shown in Figs. 1 and 2.

The levers D are connected together at their lower ends, and are pivoted to the support K, attached to the top-gallant forecastle-deck, as shown in Fig. 2.

L is the short pawl, which is pivoted to the lever H near its lower end, as shown in Fig. 1. This pawl is nearly straight, and its upper end takes hold of the teeth of the ratchet-wheel G and revolves the windlass by being pressed against it by the lever H. In this place a single pawl may be used; but I prefer to use two pawls pivoted to the lever H by the same pin, and similar to each other in every respect, except that one exceeds the other in length by about half the distance between any two consecutive teeth of the said ratchet-wheels G.

By this construction the windlass can never run back a greater distance than half the distance between two adjacent teeth without one or the other of the pawls taking hold of a tooth and operating said windlass.

To the forward side of the upward curve $h'$ of the levers H are pivoted the long pawls M. These pawls are longer than the pawls L, are similar to them in shape, and may be used singly or doubly, two pawls differing in length being pivoted by the same pin to the lever H in the manner before described with reference to the pawls L. These pawls M, being pivoted to the lever H at a greater distance from its lower end than the pawls L, have a greater sweep than they have, and consequently move the windlass B through a greater space at a single operation of the lever D than the pawls L can.

N is a bent lever-stop, pivoted to the lever H between the pivoting-points of the pawls L and M, as shown in Fig. 1. The forward end of the lever-stop N is bent over and passes beneath the pawls M, as shown in Fig. 2, and its rear end is weighted, so that when said rear end is unsupported it will be depressed and the front end elevated, lifting the pawls M away from the ratchet-wheels G, as represented in Fig. 1. If, now, the levers D are operated, the windlass will work at its maximum power.

To the rear end of the lever-stop is attached a cord, O, which passes up by the side of the bar J, through the top-gallant forecastle-deck C. If this cord is drawn taut and secured to the belaying-pin P the forward end of the lever-stop N will be withdrawn from the pawls M and said pawls allowed to come in contact with the ratchet-wheel G. If, now, the lever D be worked, the windlass B will be operated at its maximum speed, but with diminished power.

By this construction and arrangement of the pawls, levers, and stops the windlass may be worked, with increased power or increased speed, as the circumstances of the case may require.

I claim as new and desire to secure by Letters Patent—

The combination of the two sets of single or double pawls L and M and bent lever-stop N with each other, with the lever H, and with the ratchet-wheels G of the windlass B, substantially as herein described, and for the purpose set forth.

JOHN S. GETCHELL.

Witnesses:
   IGNS. SARGENT,
   JOHN INGLEE.